Aug. 15, 1961    A. L. MOSSMAN    2,996,359
METHOD FOR CONTINUOUS MANUFACTURE OF CARBON MONOXIDE
Filed Nov. 26, 1957    2 Sheets-Sheet 1
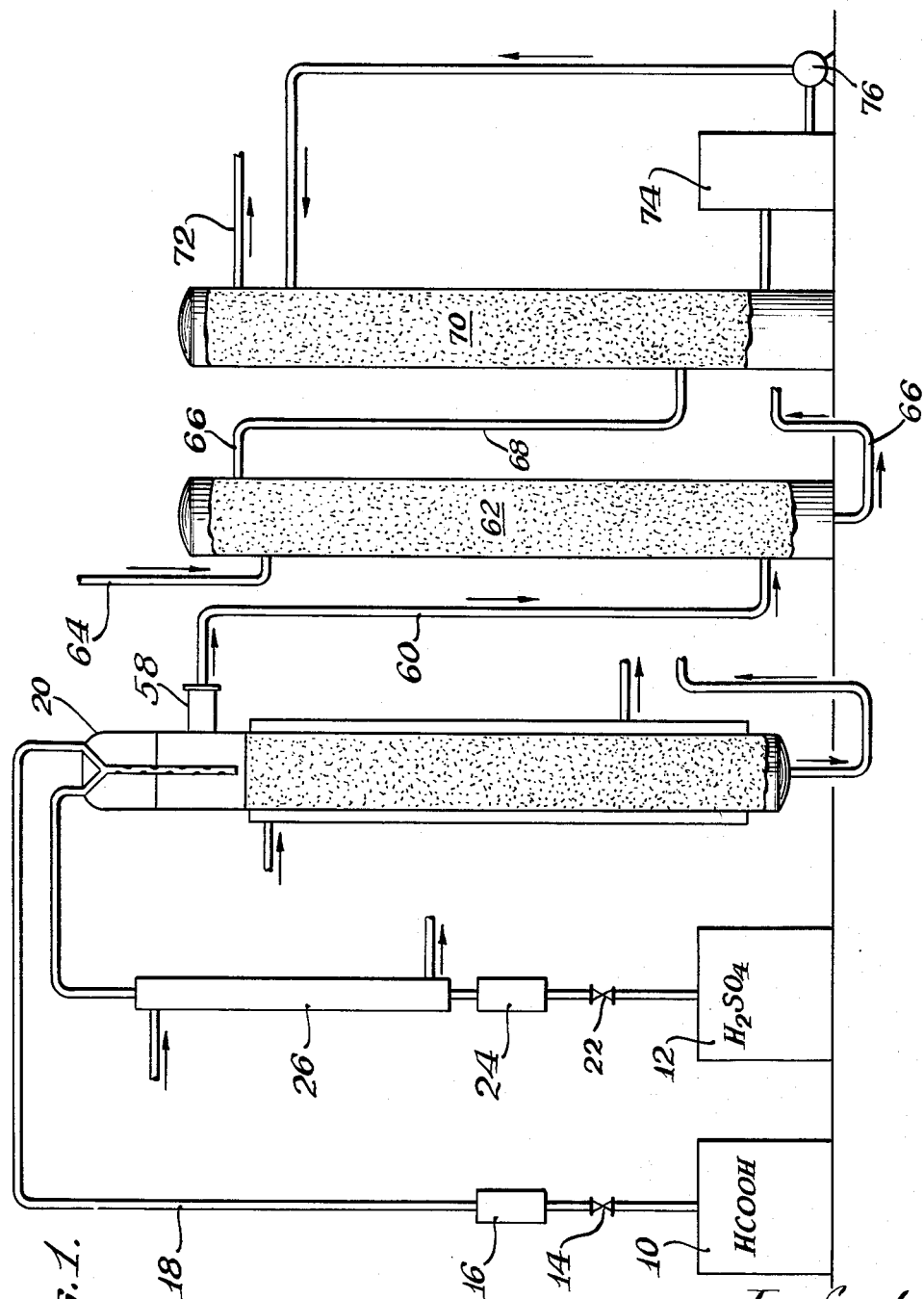
Inventor
Allen L. Mossman
By Horton, Davis, Brewer & Brugman
Attys.

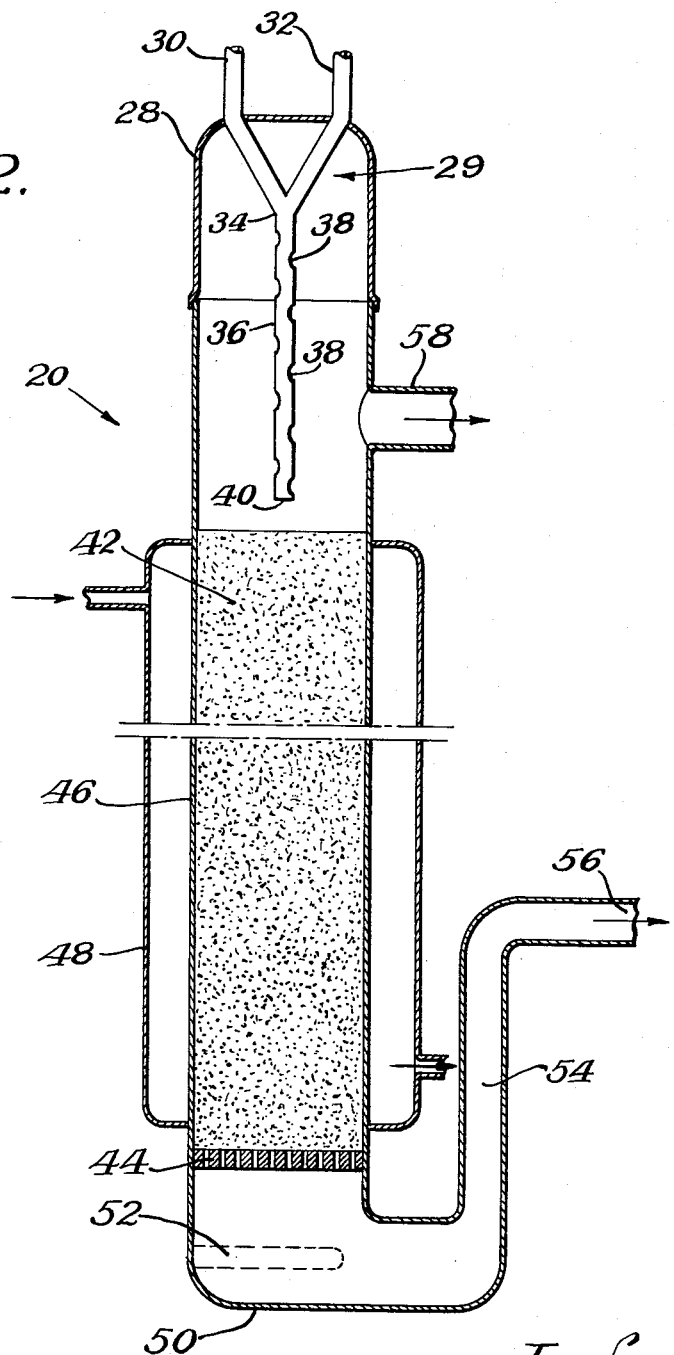

2,996,359
METHOD FOR CONTINUOUS MANUFACTURE OF CARBON MONOXIDE

Allen L. Mossman, Cedar Grove, N.J., assignor to The Matheson Company, Inc., East Rutherford, N.J., a corporation of New Jersey
Filed Nov. 26, 1957, Ser. No. 698,983
4 Claims. (Cl. 23—204)

My invention relates to a method and apparatus for making carbon monoxide and more particularly to a continuous commercial manufacture thereof.

While it is well known that the dehydration of formic acid with sulfuric acid is a procedure recommended in elementary chemistry textbooks for the preparation of laboratory quantities of carbon monoxide, it has not been regarded seriously as a method of commercial preparation. The laboratory process is essentially a batch process. Such a process is wasteful of reactants, first, because the apparatus must be flushed out with initially formed carbon monoxide for each batch before a pure product can be collected; second, because, as the acid is diluted, the reaction becomes sluggish and the yield of carbon monoxide falls off; and third, because the product essentially is limited by the size of the equipment. My invention has as its primary objective, therefore, the provision of a method for making carbon monoxide gas of a high degree of purity, simply, inexpensively and continuously by the use of this reaction.

Another objective of my invention may be considered to be the provision of apparatus wherein such a process may be conducted.

Other objects and advantages of my invention will be apparent from the drawings, of which:

FIG. 1 is an elevation, partially diagrammatic in nature, of the apparatus in which my process is conducted; and, FIG. 2 is an enlarged section of the reactor head illustrated in FIG. 1.

My process comprises essentially a mixing together of concentrated sulfuric acid, desirably ninety-eight percent, with formic acid of a minimum of ninety percent purity. The reaction is conducted at approximately 120° to 130° C,. which results in a completed reaction and the termination of the evolution of carbon monoxide in about a ten-second time interval.

Thereafter, the carbon monoxide is freed successively from acid vapors and entrained acid and carbon dioxide, is compressed, freed of oil and dried before packaging in cylinders.

In FIG. 1, a source of formic acid 10 and a source of sulfuric acid 12 are shown. The formic acid is pumped through a control valve 14 and a flow meter 16 into a duct 18 and to the reactor head 20. The sulfuric acid is likewise pumped from reservoir 12 through a control valve 22 and a flow meter 24, a steam jacket 26 and thence to the reactor head 20. The steam jacket 26 has the effect of preheating the sulfuric acid to about 100° C.

In the illustrated embodiment, the reactor head 20 is formed of glass and includes a dome 28 through which tubes 30 and 32 extend as illustrated. Tube 32 is connected to duct 18 and is the tube through which the formic acid enters the reactor head. Tube 30 is that tube through which the sulfuric acid enters.

Downwardly of the dome and within the reactor head, the two tubes merge as at 34 and a baffle tube 36 extends downwardly from point 34 and has a plurality of baffles 38 therein by which the incoming sulfuric acid and formic acid are thoroughly mixed. The open lower end 40 of the baffle tube terminates above a ceramic packing 42 within the reactor. The packing may be supported by a ceramic screen 44 adjacent the bottom of the reactor. The packed portion 46 of the tube is surrounded by a steam jacket 48. The bottom 50 of the reactor below screen 44 contains a thermometer well 52 through which the temperature of the exhausted effluent can be measured, and an effluent discharge line 54 which acts as a liquid seal extends from the bottom 50 of the reactor upwardly to a point overlapping the bottom portion of the ceramic packing and outward to discharge 56.

The reactor head likewise includes a side arm 58 situated above the packing and above the lower end 40 of the baffle tube through which carbon monoxide is discharged from the reactor.

The raw carbon monoxide passes from side arm 58 through line 60 to the lower end of a water scrubbing unit 62 packed with a ceramic granular packing. Water is admitted into the upper end of the scrubbing unit through a line 64 and out through the lower end of the scrubbing unit through line 66. The carbon monoxide passes up through the wetted packing contained in the scrubbing unit 62 to outlet 66. The gas is then conducted by line 68 into the lower end of a carbon dioxide scrubber 70 packed with ceramic rings. The gas passes up through the packing, wetted with five percent caustic solution and out through outlet 72 to a gas holder, compressor, oil remover, and drier, as is well known in the art.

A reservoir 74 and a pump 76 are provided to keep the caustic solution in continuous circulation into the top of the scrubber 70 and out through the bottom thereof so as to prevent exhaustion of the solution and obtain a flow counter to the passage of the gas therethrough.

My method and the fashion in which the above described apparatus operates is as follows. As stated above, the formic acid and sulfuric acid are pumped through, respectively, their flow valves and meters, the sulfuric acid being pre-heated to approximately 100° C. in the steam jacket 26. The two liquids enter the reactor through the arms of the Y-tube 29 and are mixed together in the baffled stem 36. The mixed liquids drop immediately through onto the heated ceramic packing 42 which serves the purpose of furthering the mixing of the two liquids, bringing the liquid mixture to reaction temperature, and retarding the rate of the passage of the mixed liquid through the reactor. The reaction zone in the ceramic packing is heated by saturated steam at fifty p.s.i. in the steam jacket 48 to achieve a temperature in the reaction zone of 120° C. At this temperature and at the concentrations of the two components, it was found that the dehydration of the formic acid is substantially complete within ten seconds or less.

The purpose achieved by pre-heating the sulfuric acid resides in the fact that, with the pre-heated acid, the reaction begins immediately upon mixing the liquids in the baffled stem 36 and the reaction of the mixture is appreciably under way before the mixed liquids encounter the heated ceramic packing 42 in the reaction zone. I have found that the introduction of the mixed cold components directly into the reaction zone causes a substantial bubbling up or foaming of the reaction mixture which disorders the passage of successive increments of reaction mixture through the reaction zone and, likewise, causes the passage of contaminants in the gas stream out of the reactor. A further advantage derived from pre-heating the sulfuric acid resides in the fact that heat transfer from the steam jacket 48 through to the center of the ceramic packing in the reaction zone is not rapid and much higher temperatures must, therefore, be used to heat the reaction zone than are possible with the pre-heated introduced components. Back flow of generated carbon monoxide through the inlet tubes 30 and 32 is prohibited by the pressure of the entering reactants.

The temperature which has been uniformly suggested in the literature for conducting this particular dehydration has been 70 to 80° C. At that temperature, however, the rate of carbon monoxide generation and the reaction time is too slow for feasible commercial production, particularly in a continuous process. Retention of the mixed liquids in a reaction zone for so long a period without contamination of the reacting substances by the spent and diluted sulfuric acid of the previously reacting portion is impossible. The elevation of the reaction temperature to 120° C. together with the ceramic packed reaction zone provides a rapid evolution of carbon monoxide and a short reaction time, and the ceramic packing sufficiently retards and regionalizes each reacting increment of mixture so as to obtain not only a rapid production of carbon monoxide, but an efficient one as well.

The reaction is roughly controlled by inspection of the effluent. When evolution of carbon monoxide appears in the effluent, the relative quantity of sulfuric acid is increased to just eliminate any gas evolution in the effluent. I find that under the optimum conditions, to give maximum economical yield, the weight proportions of the reaction mixture are thirty-three parts of ninety percent formic acid to one hundred parts of ninety-eight percent sulfuric acid. Essentially a yield of one hundred percent is obtained, based on recoverable carbon monoxide from ninety percent formic acid.

The hot effluent consists essentially of eighty percent sulfuric acid. Depending on the scale of the operation, the effluent may be discharged or recirculation methods may be employed to scavenge the heat of the effluent or even to reconcentrate the sulfuric acid and use it again.

The evolved carbon monoxide passes through the side arm 58 and line 60 into the acid vapor scrubber. The passage of the evolved gas through the water contained in the scrubber effectually removes any acid vapors or entrained acids. The gas then is conducted into the carbon dioxide scrubber, and the five percent caustic solution contained therein effectively absorbs the carbon dioxide.

When the reaction is first started, the first evolved quantities of carbon monoxide will be wasted so as to flush the apparatus of contaminating gases. Thereafter, as stated, the gas goes through the normal processes incident to going into the cylinders.

I have found that my process produces carbon monoxide of a high degree of purity, about ninety-nine and nine-tenths percent. My tests show that carbon dioxide is present in the negligible quantity of less than one-tenth percent.

It will be appreciated from the foregoing description that while the basic reaction on which my invention is premised is old, I have devised modifications in the process as hitherto known in the literature and provided apparatus which, with these modifications, makes possible commercial and continuous production of carbon monoxide. It will be evident from the foregoing description that there will be alternatives as to both procedure and apparatus, and I, therefore, desire that my invention be regarded as being limited only as set forth in the following claims.

I claim:

1. A process for the continuous production of carbon monoxide which comprises preheating a continuous stream of concentrated sulfuric acid to about 100° C., delivering continuously said sulfuric acid and a continuous stream of concentrated formic acid into the top of a vertical reactor, mixing said streams together in the top of said reactor in the approximate proportion of one hundred parts of said sulfuric acid to thirty-three parts of said formic acid thereby to initiate the reaction therebetween, delivering said mixed and reacting acids into a reaction zone having an inert packing therein in said reactor, holding said reaction zone at a temperature of from 120° to 130° C. to complete said reaction, said packing retarding the descent of said mixture through said zone until the reaction is substantially complete in said zone, and withdrawing the carbon monoxide from said reactor.

2. A method for the continuous production of carbon monoxide which comprises introducing a stream of concentrated sulfuric acid and concentrated formic acid into the top of a vertical reactor, at least one of said acids being preheated sufficiently to begin the reaction between said acids upon mixing thereof, mixing said acids in the top of said reactor in the approximate proportion of one hundred parts of said sulfuric acid to thirty-three parts of said formic acid thereby to initiate the reaction therebetween, delivering said mixed and reacting acids into a reaction zone having an inert packing therein in said reactor, holding said reaction zone at a temperature of from 120° to 130° C. to complete said reaction, said packing retarding the descent of said mixture through said zone until the reaction is substantially complete in said zone, and withdrawing the carbon monoxide from said reactor.

3. A method for the continuous production of carbon monoxide which comprises introducing a stream of sulfuric acid of at least 98% concentration and a stream of formic acid of at least 90% concentration, at least one of said streams being pre-heated sufficiently to initiate a reaction between them, into a baffled mixing conduit, discharging the resultant mixed stream from said baffled conduit into the upper section of a packed reaction zone heated to maintain the reactants at a temperature of from about 100° C. to about 130° C., withdrawing sulfuric acid from beneath said reaction zone and recovering carbon monoxide from the upper portion of said reaction zone.

4. A method for the continuous production of carbon monoxide which comprises introducing a preheated stream of sulfuric acid of at least 98% concentration and a stream of formic acid of at least 90% concentration, into a baffled mixing conduit in the proportion of 100 parts of sulfuric acid to 30 parts of formic acid, said sulfuric acid stream preheated sufficiently so that the temperature of the mixed streams is from about 100° C. to about 130° C., discharging the resultant mixed stream from said conduit into the upper section of a packed reaction zone heated to maintain the reactants at a temperature of from about 100° C. to about 130° C., withdrawing sulfuric acid from beneath said reaction zone and recovering carbon monoxide from the upper portion of said reaction zone.

References Cited in the file of this patent

UNITED STATES PATENTS

| | | |
|---|---|---|
| 993,868 | Pauling | May 30, 1911 |
| 1,338,418 | Bohre | Apr. 27, 1920 |
| 2,212,835 | Keane et al. | Aug. 27, 1940 |
| 2,805,982 | Swinehart et al. | Sept. 10, 1957 |

OTHER REFERENCES

"Syntheses Under High Pressure, Interaction of Carbon Monoxide and Hydrogen," G. T. Morgan et al., Journal of the Society of Chemical Industry, vol. 47 (1928), pp. 117–122T, plate showing figures between pages 118T and 119T.

Chemical Engineers' Handbook, edited by J. H. Perry, 3rd ed., McGraw-Hill Book Co., Inc., 1950, pp. 1038-9, 1217.